United States Patent Office 3,630,962
Patented Dec. 28, 1971

3,630,962
AZINES AND HYDRAZONES AS PAINT DRIER ACCELERATORS
Christian H. Stapfer, Newtown, Pa., assignor to Carlisle Chemical Works, Inc., Reading, Ohio
No Drawing. Filed Mar. 13, 1970, Ser. No. 19,512
Int. Cl. C09d 3/64
U.S. Cl. 252—431 C
10 Claims

ABSTRACT OF THE DISCLOSURE

Organic azines or hydrazones are used as activators for cobalt, ziraconium, iron, manganese and zinc carboxylates driers for drying alkyd paints and varnishes or to promote oxidative polymerization of olefinic polymer systems, particularly unsaturated polyester resins in conjunction with organic peroxides and cobalt or other transition metal driers. The azines or hydrazones can be stabilized with phenolic antioxidants. The azines are preferred to the hydrazones, cyclohexane azine being most preferred. Particularly good results are obtained with cobalt driers and azines (or hydrazones) due to the formation of a blue complex which has a whitening effect on the composition.

---

This invention relates to catalyst compositions, coating compositions, and also to the transition metal catalyzed autoxidation of olefinic materials, particularly unsaturated polyesters. More particularly, this invention relates to catalyst compositions containing cobalt, manganese, iron or zinc salts as primary drying catalyst (with cobalt salts being preferred), organic azine or hydrazones as specified infra as drying accelerators and a drying alkyd paint or an antioxidizable unsaturated polyester composition.

The term "paint" is used herein to include oil-base paint, water-based and organic based varnishes, lacquers and similar coating compositions which may be clear, pigmented, or contain dyes.

The curing or drying of coating compositions such as alkyd paint formulations is frequently catalyzed by various metal salts. Cobalt soaps are especially preferred as paint dryers because they most actively promote the formation of free radicals at loci of unsaturation in films of coatings and paint. The production of these free radicals catalyze an autoxidation process resulting in actual crosslinking within the film. However, cobalt salts have had several disadvantages prior to my invention. In addition to high cost, cobalt salts cause extensive wrinkling in paint films when used in amounts necessary to produce commerially desirable drying times. It has been usually necessary to replace a portion of the cobalt salt with a salt of a less expensive metal because of the high cost and in order to prevent wrinkling, the replacement of the amount of cobalt salt necessary to prevent wrinkling results in a substantial increase in the time required for drying. Attempts have been made to accelerate the drying of alkyd paints by including compounds such as 1,10-phenanthroline, 2,2'-bipyridine or 8-hydroxyquinoline. While these accelerators have been used for cobalt and manganese drying catalysts, they have not attained significant commercial importance. Although they may be good accelerators, these compounds are far too expensive to be used in the necessary amounts and also promote discoloration of the paint film. For example, 1,10-phenanthroline cannot be used in quantities exceeding 0.05 weight percent of the paint because higher concentrations cause the paint film to yellow and when used in levels of 0.05 weight percent, the acceleration of drying time is not sufficient to off-set the increase in cost.

Hydrazines have also been proposed as activators in drying alkyd paints but they cause extreme discoloration (yellowing), surface wrinkling and deterioration. Moreover, they are not as active as would be desired.

It is also well known that the cross linking polymerization of olefinic polymers such as styrene or butadiene modified polyester resins proceed by oxygen transfer using organic peroxides as a source of free radical and the same cobalt carboxylates as above as cocatalysts. Although cobalt soaps are the preferred cocatalysts for the polymerization of these resins, mainly because they allow good curing characteristics and dimensional stability, the time span in which they cause the polymeric resin to gel is long and, should one want to reduce said time span by increasing the amount of cobalt, they have a tendency to severely discolor the resin.

Furthermore, in various applications where the polyester resin formulation contains water, cobalt carboxylates are altogether inadequate to promote cross linking.

The use of various pyridine compounds including 2-pyridine aldazine has been proposed as accelerators for cobalt and other driers in Wheeler Patent 2,961,331. However, the pyridine aldehydes required to make the azines are expensive. Furthermore, it was considered essential to have the pyridine nucleus present.

It is a primary object of the present invention to provide catalyst compositions which avoid the disadvantages of the prior art and may be conveniently distributed and mixed with coating compositions, olefinic polymer compositions and paint formulations.

It is another object of the present invention to provide accelerators for drying coating compositions or unsaturated polyester which are inexpensive, reduce the essential concentration of the primary drying catalyst and may be used in relatively high levels without adversely affecting the color of the composition.

Another object of the present invention is to provide alkyd paint formulations which have improved drying times and are not discolored by the drying accelerators.

It has now been found that these objects can be attained by preparing catalyst compositions, coating composition and particularly alkyd piant formulations containing organic carboxylic acid salts of cobalt, manganese, iron, zirconium and zinc as primary drying catalysts or cocatalysts are substantially improved by the inclusion of an organic azine or hydrazone as hereinafter defined as a drying accelerator. Similarly these same azines and hydrazones are useful as the promoters for other oxidative polymerization reactions such as cross-linking of olefinic polymer systems, particularly unsaturated polyesters initiated by organic peroxides and co-catalyzed with transition metal (i.e. cobalt, iron or nickel) carboxylates.

The use of cobalt carboxylates is especially preferred in the present invention since unexpectedly the azines and hydrazones of the present invention form blue complexes with the cobalt compound which has a whitening effect on the reuslting composition, e.g. unsaturated polyester or oil modified alkyd resin composition.

Unless otherwise indicated, all parts and percentages are by weight.

The azines and hydrazones useful in the present invention correspond to the formulae (1) 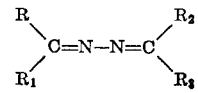

or (2) 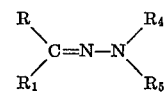

where R, R₂, R₄ and R₅ are hydrogen, alkyl, aryl, haloaryl, haloalkyl, aralkyl, furyl, tetrahydrofuryl and R₁ and $R_3$ are alkyl, aryl, haloaryl, haloalkyl, aralkyl, furyl, tetrahydrofuryl or

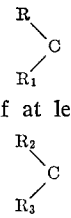

together is cycloalkyl of at least 3 carbon atoms and

together is cycloalkyl of at least 3 carbon atoms, and preferably 5 to 6 carbon atoms. The preparation of such azines and hydrazones is well known and the usual method of forming an azine is by reacting an aldehyde or ketone with hydrazine ($H_2NNH_2$) while the usual way of forming a hydrazone is by reacting hydrazine or an organic hydrazine of the formula

with an aldehyde or ketone. The azines are preferred to the hydrazones, the ketazines to the aldazines and the most preferred accelerator is cyclohexanone azine.

Typical aldehydes and ketones suitable for forming the azines and hydrazones used in the present invention are acetaldehyde, propionaldehyde, butyraldehyde, isobutyraldehyde, valeraldehyde, caproaldehyde, decanal, stearaldehyde, benzaldehyde, o-tolualdehyde, p-tolualdehyde, p-isopropylbenzaldehyde, o-chlorobenzaldehyde, o-fluorobenzaldehyde, p-bromobenzaldehyde, p-fluorobenzaldehyde, m-chlorobenzaldehyde, p-chlorobenzaldehyde, alpha naphthaldehyde, phenyl acetaldehyde, phenylpropionaldehyde, furfural, tetrahydrofurfural, acetone, methyl ethyl ketone, diethyl ketone, di-n-propyl ketone, diisopropyl ketone, di-n-butyl ketone, di-sec-butyl ketone, di-t-butyl ketone, di-n-amyl ketone, di-n-hexyl ketone, di-n-octyl ketone, di-n-decyl ketone, laurone, stearone, methyl ethyl ketone, methyl-n-propyl ketone, methyl isopropyl ketone, methyl-n-butyl ketone, pinacolone, methyl-n-amyl ketone, methyl-n-hexyl ketone, methyl-n-decyl ketone, ethyl-n-propyl ketone, propyl isopropyl ketone, methyl cyclopropyl ketone, 1-chloro-2-propanone (chloroacetone), bromoacetone, cyclobutanone, cyclopentanone, cyclohexanone, 2-methyl cyclohexanone, cycloheptanone, cyclopentadecanone, acetophenone, pivalophenone, valerophenone, propiophenone, laurophenone, methyl-2-naphthyl ketone, methyl-1-naphthyl ketone, benzophenone, 1-naphthyl phenyl ketone, furyl methyl ketone.

For forming the hydrazones organic hydrazines can be employed such as phenyl hydrazine, p-tolyl hydrazine, methyl hydrazine, ethyl hydrazine, allyl hydrazine, isopropyl hydrazine, n-hexadecyl hydrazine, cyclohexyl hydrazine, benzyl hydrazine, 2-naphthyl hydrazine, 1,1-dimethyl hydrazine, 1,1-diethyl hydrazine, 1-n-butyl-1-methyl hydrazine, 1,1-di-n-hexadecyl hydrazine, 1-methyl-1-phenyl hydrazine, 1,1-diphenyl hydrazine 2-chlorophenyl hydrazine, phenylethyl hydrazine, octylhydrazine, p-ethylphenyl hydrazine.

As suitable azines and hydrazones for use in the invention, there can be used acetaldazine, propionaldazine, butyraldazine, isobutyraldazine, valeraldazine, acetone azine, methyl ethyl ketazine, diethyl ketazine (3-pentanone azine), methyl propyl ketazine, methyl butyl ketazine, dibutyl ketazine, dipropyl ketazine, ethyl butyl ketazine, ethyl propyl ketazine, propyl butyl ketazine, cyclohexanone azine, p-bromoacetophenone, phenyl hydrazone, cyclopentanone azine, 2-methyl cyclohexanone azine, cyclobutanone azine, chloroacetone azine, bromoacetone azine, furfuraldazine, 2-chlorobenzaldazine, benzaldazine, acetaldehyde acetone azine, acetone acetophenone azine, acetophenone azine, benzophenone azine, cyclohexanone benzaldazine, acetaldehyde hydrazone, benzal hydrazone, p-methylbenzal hydrazone, p-tolual hydrazone, benzophenone hydrazone, acetophenone hydrazone, acetaldehyde phenyl hydrazone, cyclohexanone hydrazone, acetone phenyl hydrazone, cyclohexanone phenyl hydrazone, benzophenone phenyl hydrazone, furfural hydrazone, pentanone-3-hydrazone, butanone-2-hydrazone, heptadecanone-9-hydrazone, pentacosanone-3 - hydrazone, cyclohexylidene acetylidene azine, acetone dimethyl hydrazone, acetaldehyde dimethyl hydrazone, isobutyraldehyde dimethyl hydrazone, cyclohexanone dimethyl hydrazone, n-butyraldehyde di-n-butyl hydrazone.

As the driers, there can be used cobalt, iron, zinc and manganese carboxylates such as the naphthenates, octoates and neodecanoates, etc. Specific examples of driers include zinc stearate, zinc naphthenate, iron naphthenate, manganese naphthenate, cobalt naphthenate, cobalt 2-ethyl hexanonate, manganese 2-ethyl hexanonate, zinc 2-ethyl hexanoate, cobalt linoleate, cobalt neodecanoate, cobalt resinate, iron resinate, manganese resinate, manganese neodecanoate, cobalt 3,5,5-tri-methyl hexoate, zirconium 2-ethyl hexanonate, zirconium naphthenate, zirconium 3,5,5-trimethylhexoate, cobalt tallate.

The azines and hydrazones of the present invention significantly shorten the drying time of paint formulations and the curing of unsaturated polyesters. They are particularly valuable in improving the drying ability of long oil alkyd paints which usually require long drying times even with high metal concentrations and in activating the cross-linking polymerization of unsaturated polyester resins even when such polyester resins are extended with water.

Azines and hydrazones have the merit of being inexpensive additives which can be used in a wide range of quantities without detrimental effects. The recommended levels of use varies from 0.1 to 20 moles of azine or hydrazone per atom of drier metal present in the paint or resin formulation.

The metal driers are employed in their conventional amounts in the unsaturated polyester and paint formulations, e.g. 0.001–12%, of the metal based on the weight of the entire composition.

In the crosslinking of olefinic polymer systems, e.g. unsaturated polyesters, there are included peroxides as is conventional in the art. The peroxide can be 0.05 to 5%, based on the polymer. Examples of suitable peroxides include methyl ethyl ketone peroxide, dicumyl peroxide, benzoyl peroxide, cumene hydroperoxide, di (t-butyl peroxide), m-bis ($\alpha$-t-butylperoxyisopropyl) benzene, methyl isobutyl ketone peroxide, cyclohexanone peroxide, methyl tetra-hydrofurane hydroperoxide, bis (4-chlorobenzoyl) peroxide, phthalyl peroxide, dilauroyl peroxide, t-butyl peracetate, diacetyl peroxide, di (2,4-dichlorobenzoyl) peroxide, dipelargonyl peroxide, 3,5-dihydroxy-3,5-dimethyl-1,2-dioxacyclopentane, t-butyl peroxybenzoate, t-butyl peroxy (2-ethylhexanoate) O,O-t-butyl O-isopropyl mono peroxycarbonate, 2,5-dimethyl-2,5-di (benzoylperoxy) hexane, t-butyl peroxy (2-ethylbutyrate), 2,5-dimethyl-2,5-di (2-ethylhexanoylperoxy) hexane, di-t-butyl diperoxyphthalate, O,O-t-butyl hydrogen monoperoxymaleate, n-butyl 4,4-bis (t-butylperoxy) valerate, 2,5-dimethyl-2,5-bis (t-butylperoxy) hexane, bis-(p-bromobenzoyl) peroxide.

Any of the conventional pigments can be employed in the paints such as titanium dioxide, ferric oxide calcium oxide, zinc oxide, ochre, litharge, white lead, clays, e.g. kaolin and china clay, calcium carbonate, silica, talc, asbestos, diatomaceous earth, basic lead carbonate, whiting lithopone, zinc sulfide, antimony trioxide, barium sulfate, red lead, Spanish oxide, burnt sienna, red iron oxide, Venetian red, cadmium red, cadimium sulfoselenide, cadmium-mercury sulfide, raw umber, burnt umber, sienna, hydrated yellow iron oxide, crrome yellow, chrome organ,e molybdenum orange, zinc chromate, basic zinc chromate, cadmium yellow, chrome green, chromium oxide green, iron blue, ultramarine, blue basic lead sulfate, carbon black, precipitated black iron oxide and metallic pigments, e.g. iluminum powder.

Conventional paint solvents can be employed such as aromatic and aliphatic hydrocarbons, e.g. benzene, toluene, xylene, aromatic naphtha, mineral spirits, isooctanes, hexane petroleum ether and V.M. & P. naphtha, as well as water for water-based paints.

The instability of azines and hydrazones in air is well known. The azines and hydrazones which tend to darken upon storage can be stabilized against oxidation by incorporating from 0.001 to 10%, usually at least 0.1% and preferably 1 to 5%, by weight of the azine or hydrazone of a phenolic antioxidant. The antioxidant, of course, is not used in sufficient amount to inhibit curing of the polymers. Any of the typical substituted phenols can be used. Examples of suitable phenolic antioxidants include alkyl phenols such as p-octyl phenol, p-nonyl phenol, 2,6-di-t-butyl p-cresol, diphenylol propane, 2,6-di-octadecyl p-cresol, butylated hydroxy anisole, propyl gallate, 4,4'-butylidene bis (6-t-butyl-m-cresol) 4,4'-thiobis (6-t-butyl-m-cresol), 4,4'-cyclohexylidene diphenol, 2,5-di-t-amyl hydroquinone, hydroquinone monobenzyl ether, 2,2'-methylene-bis-(4-methyl-6-t-butylphenol), 2,6-dibutyl 4-decyloxy phenol, 2-t-butyl-4-dodecyloxy phenol, 2-t-butyl-4-dodecyloxy phenol, 2-t-butyl-4-octadecyloxy phenol, 4,4'-methylene-bis-(2,6-di-t-butyl phenol), 4,4'-thio bis (3-methyl-6-t-butyl phenol), p [o-(1,1,3,3-tetramethyl butyl) phenol] sulfide, 4-acetyl-β-resorcylic acid, A stage p-t-butylphenol-formaldehyde resin, 4-dodecyloxy-2-hydroxybenzophenone, 3 - hydroxy - 4 - (phenylcarbonyl) phenyl carbonyl)palmitate, n - dodecyl ester of 3 - hydroxy - 4 - (phenyl carbonyl) phenoxyacetic acid, p-t-butyl phenol, 1,1'-methylene bis-2-naphthol, butylated hydroxytoluene, 2,5-di - t - butyl p - phenylphonol, 2,2' - methylene bis (4-methyl-6-nonylphenol), 2,2'-methylene bis (4-ethyl-6-t-butyl-phenol), polybutylated 4,4'-isopropylidene diphenol, 4,4'-methylene bis (6-t-butyl-o-cresol), 4,4'-thiobis (2,6-di-t-butyl-phenol), thiobis (di-sec-amyl phenol), styrenated phenol.

The azine and hydrazone drying accelerators of the present invention can be employed with any of the conventional drying alkyd resins and unsaturated polyesters.

The curing alkyd resins can be made from acids (or the anhydrides if available) such as phthalic anhydride, isophthalic acid, trimellitic acid, pyromellitic acid, trimesic acid, maleic anhydride, fumaric acid, azelaic acid, succinic acid, adipic acid, tetrahydrophthalic anhydride, tetrachlorophthalic anhydride, dimerized fatty acids and sebacic acid reacted with polyhydric alcohols such as glycerol, pentaerythritol, dipentaerythritol, trimethylolethane, sorbitol, trimethylolpropane, ethylene glycol, propylene glycol, neopentylene glycol and dipropylene glycol together with drying oils such as soyabean oil, linseed oil, tung oil, dehydrated castor oil, fish oil, corn oil, perilla oil, safflower oil, ioticica oil and cottonseed oil, as well as the acids of such drying oils and tall oil acids.

Typical suitable unsaturated oil or fatty acid modified alkyd resins are set forth below. They can have oil lengths of 30 to 70 or even higher.

|  | Alkyd A, parts |
|---|---|
| Tall oil fatty acids | 127.0 |
| Pentaerythritol | 73.3 |
| Ethylene glycol | 34.9 |
| Phthalic anhydride | 145.0 |
| Maleic anhydride | 3.0 |
| Acid number | 12 |

|  | Alkyd B, parts |
|---|---|
| Soyabean oil | 130.0 |
| 98% glycerol | 90.0 |
| Phthalic anhydride | 145.0 |
| Maleic anhydride | 3.0 |
| Acid number | 8 |

|  | Alkyd C, parts | Alkyd D, parts |
|---|---|---|
| Soyabean oil | 25.0 |  |
| Litharge | 0.06 |  |
| Pentaerythritol | 60.0 | 110.0 |
| Phthalic anhydride | 148.0 | 148.0 |
| Tall oil fatty acids |  | 260.0 |
| Ethylene glycol |  | 12.5 |
| Acid number | 10 | 10 |

|  | Alkyd E, parts | Alkyd F, parts |
|---|---|---|
| Soyabean oil | 132.0 | 175.0 |
| Linseed oil | 132.0 |  |
| Dehydrated castor oil |  | 50.0 |
| Litharge | 0.09 | 0.05 |
| Pentaerythritol | 91.0 |  |
| Glycerol |  | 83.0 |
| Phthalic anhydride | 148.0 | 145.0 |
| Maleic anhydride |  | 3.0 |
| Acid number | 12 | 8 |

|  | Alkyd G, parts | Alkyd H, parts |
|---|---|---|
| Tall oil fatty acids | 322.0 | 230.0 |
| Safflower oil |  | 156.0 |
| Litharge |  | 0.04 |
| Pentaerythritol | 126.0 | 109.0 |
| Phthalic anhydride | 148.0 | 148.0 |
| Acid number | 10 | 8 |

|  | Alkyd I, parts | Alkyd J, parts |
|---|---|---|
| Soyabean oil | 366.0 |  |
| Menhadan oil |  | 400.0 |
| Litharge | 0.08 | 0.10 |
| Pentaerythritol | 81.0 | 75.0 |
| 98% glycerol |  | 23.0 |
| Phthalic anhydride | 145.0 |  |
| Isophthalic acid |  | 166.0 |
| Maleic anhydride | 3.0 |  |
| Acid number | 10 | 12 |

|  | Alkyd K, parts | Alkyd L, parts |
|---|---|---|
| Tall oil fatty acids | 719.0 | 1,740.0 |
| Pentaerythritol | 173.0 | 284.0 |
| Isophthalic acid | 166.0 | 166.0 |
| Acid number | 10 | 12 |

|  | Alkyd M, parts | Alkyd N, parts |
|---|---|---|
| Linseed oil | 700.0 |  |
| Safflower oil |  | 1,180.0 |
| Litharge | 0.07 | 0.08 |
| Pentaerythritol | 71.0 | 80.0 |
| Phthalic anhydride | 148.0 |  |
| Isophthalic acid |  | 166.0 |
| Acid number | 10 | 8 |

Typical examples of unsaturated polyesters, polyester resins are set forth below. In polyesters A through I, the acid and alcohol components prereacted to the indicated acid number were dissolved in styrene to give 70% total nonvolatiles, i.e. the styrene was 30% of the composition. The final compositions also contained 0.015% of t-butyl catechol.

|  | Polyester A, parts | Polyester B, parts |
|---|---|---|
| 1,2-propylene glycol | 1,700 | 1,700 |
| Maleic anhydride | 1,528 | 1,528 |
| Phthalic anhydride | 770 | 770 |
| Hydroquinone | 0.40 | 0.40 |
| Acid number | 72 | 31.4 |
| Styrene | (1) | (1) |

[1] 30% of composition.

|                  | Polyester C, parts | Polyester D, parts |
|------------------|--------------------|--------------------|
| 1,2-propylene glycol | 1,700          | 1,700              |
| Fumaric acid     | 1,810              | 603                |
| Phthalic acid    | 770                | 2,309              |
| Hydroquinone     | 0.42               | 0.46               |
| Acid number      | 37.1               | 26.6               |
| Styrene          | (1)                | (1)                |

[1] 30% of composition.

|                  | Polyester E, parts |
|------------------|--------------------|
| 1,2-propylene glycol | 1,700          |
| Fumaric acid     | 1,810              |
| Isophthalic acid | 864                |
| Hydroquinone     | 0.45               |
| Acid number      | 30.3               |
| Styrene          | (1)                |

[1] 30% of composition.

|                   | Polyester F, parts | Polyester G, parts |
|-------------------|--------------------|--------------------|
| 1,2-propylene glycol | 1,700           | 1,370              |
| Fumaric acid      | 1,447              | 1,170              |
| Adipic acid       | 1,095              |                    |
| HET acid          |                    | 2,355              |
| Phthalic anhydride| 126                | 110                |
| Hydroquinone      | 0.44               | 0.5                |
| Acid number       | 11.7               | 46.7               |
| Styrene           | (1)                | (1)                |

[1] 30% of composition.

|                      | Polyester H, parts | Polyester I, parts |
|----------------------|--------------------|--------------------|
| Diethylene glycol    | 233.4              | 292.0              |
| Ethylene glycol      |                    | 170.0              |
| Maleic anhydride     | 196.1              | 343.0              |
| Phthalic anhydride   |                    | 111.0              |
| Adipic acid          |                    | 109.0              |
| p-t-Butyl catechol   | 0.02               | 0.02               |
| Acid number          | 45                 | 25                 |
| Styrene              | (1)                | (1)                |

[1] 30% of composition.

As is conventional in the art, the styrene can be 20 to 50% of the total composition. In place of styrene, there can be used other ethylenically unsaturated compounds such as diallyl phthalate, triallyl isocyanurate, acrylamide, N-t-butylacrylamide, triallyl cyanurate, p-vinyl toluene, acrylonitrile, alpha methyl styrene, divinyl benzene, N-vinyl pyrrolidone, methyl acrylate, methyl methacrylate, allyl diglycol carbonate, trimethylolpropane diallyl ether, trimethylolpropane monoallyl ether, allyl ethers of sorbitol, pentaerythritol, sucrose and glucose. Any of the polybasic acids and polyhydric alcohols employed in making alkyd resins can be incorporated as components in making the unsaturated polyester resins.

Water thinnable unsaturated polyester formulations can be used, e.g. those shown in Ghosh Patent 3,463,750 (the entire disclosure of Ghosh is incorporated by reference). A typical formula is that shown in Ghosh Example 1 made from 108 parts trimellitic anhydride, 118 parts phthalic anhydride, 108 parts trimethylolpropane and 269 parts trimethylolpropane-diallyl ether having an acid number of 50-52 and dissolved in 30 parts isopropanol, 60 parts of 28% aqueous ammonia, 390 parts of water and 90 parts t-butyl alcohol. This solution at 45% solids is hereinafter called polyester formulation J.

The following examples are illustrative of the catalyst compositions.

| Catalyst A (3% Mn):          | Parts |
|------------------------------|-------|
| Manganous naphthenate        | 12.4  |
| Cyclohexanone azine          | 50    |
| Mineral spirits              | 37.6  |
| Total                        | 100   |

| Catalyst B (2.6% Mn):        |       |
|------------------------------|-------|
| Manganous naphthenate        | 9.5   |
| Benzaldazine                 | 61.5  |
| Mineral spirits              | 29.0  |
| Total                        | 100   |

| Catalyst C (1.7% Co):        |       |
|------------------------------|-------|
| Cobaltous octoate            | 6.55  |
| Cyclohexanone azine          | 70.2  |
| Mineral spirits              | 21.55 |
| p-Nonyl phenol               | 1.07  |
| Total                        | 100   |

| Catalyst D (5% Co):          |       |
|------------------------------|-------|
| Cobaltous naphthenate        | 19.4  |
| Cyclohexanone azine          | 8.3   |
| Mineral spirits              | 64.0  |
| Benzaloxime                  | 8.3   |
| Total                        | 100   |

These catalytic compositions may be immediately blended into a coating or polyester composition or stored prior to incorporation. Also, since it may be commercially advantageous, the organic azine or hydrazone may be added to existing paint formulations having cobalt or manganese salts as drying catalysts in the recommended amounts based upon the concentration of cobalt or manganese.

The following examples are presented to illustrate the advantages of drying alkyd paint, varnish and unsaturated polyester formulations containing the accelerators and catalysts compositions of the present invention.

The standard procedure for evaluating films was the determination of time until the film was dust free and thorough hard. These times were determined in the following manner. Within 24 to 48 hours after preparation of the formulation, a film was applied on a polished plate glass panel by means of a 0.006 inch "Bird" applicator delivering a wet film thickness of 0.003 inch. The film was allowed to dry in an environmental room at constant temperature and humidity, illuminated by artifical light and allowing 95% reproducibility. The drying times of the film were determined by the improved Gardner circular drying time recorder over a period of 24 hours. The recorder basically consists of a synchronous motor with its shaft oriented in the true vertical. A pivotable arm assembly is attached to this shaft and operates a counterpoised vertical stylus consisting of a thermosetting Teflon sphere which does not stick to the drying film. When the stylus, set in motion by the motor, no longer leaves a clear channel but begins to rupture the dry upper layer of the film, the surface may be considered to be "dust free." When the stylus no longer ruptures the film but moves freely on its surface, the film may be considered "thorough hard."

EXAMPLE 1

Three clear alkyd varnish formulations were prepared containing 40 g. of 505-70 alkyd resin (a pure soya based long oil alkyd resin manufactured by McCloskey Varnish Co. having about 63% soya oil and 23% phthalic anhydride, acid No. 10 maximum), 10 g. of mineral spirits, 0.5 g. of manganous naphthenate (6% Mn). One formulation was evaluated without a curing accelerator and the other two were evaluated using cyclohexanone azine and benzaldazine respectively. The results of the drying time evaluation by the standard procedure set forth above are reported in Table A.

TABLE A

| Accelerator | Amount in grams | Time to cure in hours at 90° F./50% H₂O to— | |
|---|---|---|---|
| | | Dust free | Thorough hard |
| None | | 5 | 16 |
| Cyclohexanone azine | 0.05 | 3 | 13 |
| Benzaldazine | 0.8 | 4 | 14 |

In place of the 505–70 alkyd resin in Example 1, the same amount of Alkyd H can be used with similar results.

EXAMPLE 2

A white pigmented alkyd paint batch was prepared containing (A) 1000 g. of 505–70 alkyd resin (manufactured by McCloskey Varnish Co.), 115 g. of Rule 66 mineral spirit solvent, 1265 g. of titanium dioxide pigment and (B) a let down containing 1145 g. of 505–70 alkyd resin and 500 g. of Rule 66 mineral spirit solvent. Three 50 g. samples of the batch were catalyzed by 0.5 g. of manganese naphthenate (6% Mn). One sample was tested with no accelerator. The other two were evaluated with cyclohexanone azine in amounts of 0.05 g. and 0.5 g. respectively. The results of the drying time evaluation by the standard procedure are reported in Table B.

TABLE B

| Accelerator | Amount in grams | Time to cure in hours at 80° F./50% H₂O to— | |
|---|---|---|---|
| | | Dust free | Thorough hard |
| None | | 5 | 22 |
| Cyclohexanone azine | 0.05 | 4 | 20 |
| Do | 0.5 | 5 | 15 |

In place of the 505-alkyd resin in Example 2, the same amount of Alkyd I can be used with similar results.

EXAMPLE 3

Four batches of 50 g. of Laminac 4152 (a styrene modified rigid polyester resin viscosity 4–5 poises at 77° F. manufactured by the American Cyanamid Co.) were catalyzed by 0.5 g. of methyl ethyl ketone peroxide and 0.5 g. of a hydrocarbon (mineral spirits) solution of cobaltous naphthenate (6% Co). One batch was tested as a control without a curing accelerator. The other three were tested using different amounts of the accelerator. The gel time for a sample of each batch was determined at 22° C. on a comparative viscometer capable of measuring elapsed time to the point of gelatinization. The cure time and peak exotherm for a sample of each batch were determined on a West single pen potentiometer. The test results are reported in Table C.

TABLE C

| Accelerator | Amount in grams | Time in minutes to— | | Peak exotherm |
|---|---|---|---|---|
| | | Gel | Cure | |
| None | | 15 | 57 | 88 |
| Cyclohexanone azine | 0.05 | 12 | 53 | 90 |
| Do | 1.0 | 7 | 30 | 90 |
| Do | 3.0 | 7 | 35 | 94 |

In place of the Laminac 4152 in Example 3, there can be used Polyester A with similar results.

EXAMPLE 4

Two formulations containing 200 g. of WEP 31 (a water thinnable rigid maleic-phthalic polyester manufactured by Ashland Chemical Co.) were extended by 200 g. of water and catalyzed by 0.8 g. of methyl ethyl ketone peroxide and 2.0 g. of a 12% solution of cobalt octoate in mineral spirits. One formulation had 2.0 g. of cyclohexanone azine added as an accelerator. The formulation containing the accelerator gelled in 2 minutes, cured in 9 minutes and had a peak exotherm of 95° C. The formulation without the accelerator had not begun to gel even after several hours.

In place of the WEP 31 formulation in Example 4, there can be used Polyester formulation J with similar results.

EXAMPLE 5

Two 50 g. samples of the white pigmented alkyl paint batch prepared in Example 2 were each catalyzed by 0.19 g. cobaltous octoate (6% Co), 0.1 g. manganese naphthenate (6% Mn) and 0.39 g. Zirco (6% Zr as the naphthenate manufactured by Carlisle Chemical Works, Inc.). Both samples also contained 0.05 g. of methyl ethyl ketoxime as an antiskinning agent and one sample contained as a curing accelerator, 0.4 g. of cyclohexanone azine. Each sample was evaluated using the standard procedure at 75° F./50% H₂O for determining the time required for the paint to become dust free and thorough hard. While the sample containing the azine accelerator was dust free in 2.5 hours and thorough hard in 15 hours, the system without an accelerator required 5 hours to become dust free and 23 hours to become thorough hard. The test was repeated at 90° F./50% H₂O and the thorough hard time was reduced by 1.5 hours from 15 to 13.5 hours. Although increasing the amount of azine further accelerated curing without color or gloss alteration, the reduction in curing time was not proportional to the increase of accelerator.

In place of the 505 alkyd resin in Example 5, there can be used the same amount of Alkyl I with similar results.

EXAMPLE 6

Ten 50 g. samples from the white pigmented alkyd paint batch of Example 2 had added thereto 0.4 g. of cobaltous naphthenate (6% Co), 0.1–0.3 g. calcium naphthenate and 0.05 g. methyl ethyl ketoxime. One sample without an accelerator was evaluated using the standard procedure and the remaining nine had the accelerator indicated in Table D. The samples having the lower amounts of accelerator demonstrates a level of approximately 4 moles of accelerator per cobalt atom and the higher levels demonstrate a level of approximately 8 moles of accelerator per cobalt atom. Table D reports the evaluation results under two different sets of drying conditions.

TABLE D

| Accelerator | Amount in grams | Hours at 60° F./70% H₂O to— | | Hours at 90° F./70% H₂O to— | |
|---|---|---|---|---|---|
| | | Dust Free | Thorough Hard | Dust Free | Thorough Hard |
| None | | 4.0 | 21.5 | 1 | 14.5 |
| Cyclohexanone benzaldazine | 0.38 | 4.5 | 21.5 | 1.5 | 13.5 |
| Do | 0.76 | 4.0 | 12.0 | 2 | 4 |
| Benzaldazine | 0.42 | 2.5 | 20.5 | 1 | 9 |
| Do | 0.84 | 2.5 | 21.5 | 1 | 11 |
| Benzophenone hydrazone | 0.37 | 2.5 | 15 | 1 | 13.5 |
| Benzophenone acetone azine | 0.45 | 2.5 | 19 | 1 | 11 |
| Do | 0.91 | 3 | 18 | 1.5 | 12.5 |
| Acetone phenylhydrazone | 0.28 | 2.5 | 6 | 1 | 7.5 |
| Do | 0.57 | 2.5 | 6 | 1.5 | 5.5 |

In place of the 505 alkyd resin in Example 6, there can be used the same amount of Alkyd I with similar results.

EXAMPLE 7

Four 50 g. samples of white pigmented alkyd paint from the bath prepared in Example 1 had 0.05 g. of methyl ethyl ketoxime added as an antiskinning agent and were catalyzed by 0.5 g. of cobaltous naphthenate (6% Co). One sample was evaluated without an accelerator and the other three contained an accelerator as indicated in Table E. Each sample was evaluated at 50% relative humidity using the standard procedure for evaluation of dust free and thorough hard times at 60° and 90° F. The evaluation results are reported in Table E.

TABLE E

| Accelerator | Amount in grams | Time in hours at— | | | |
|---|---|---|---|---|---|
| | | 60° F./50% H₂O for— | | 90° F./50% H₂O for— | |
| | | Dust free | Thorough hard | Dust free | Thorough hard |
| None | | 3 | 17 | 2 | 21 |
| Cyclohexanone azine | 0.05 | 3 | 11 | | |
| Do | 0.5 | 6 | 10 | 2 | 9 |
| Benzaldazine | 0.8 | | | 2 | 17 |

In place of the 505-alkyd resin in Example 7, there can be used the same amount of Alkyd I with similar results.

EXAMPLE 8

Three clear alkyd varnish formulations were prepared according to the procedure of Example 1 except that 0.05 g. benzaldoxime was added as an antiskinning agent and cobalt naphthenate (6% Co) was substituted for the manganous naphthenate catalyst. One sample was evaluated without an accelerator; the other two contained an accelerator as indicated in Table F and all samples were evaluated according to the procedure described in Example. 1. The results of the evaluations appear in Table F.

TABLE F

| Accelerator | Amount in grams | Hours at 90° F. 50% H₂O until— | |
|---|---|---|---|
| | | Dust free | Thorough hard |
| None | | 1 | 13 |
| Cyclohexanone azine | 0.05 | 1 | 8 |
| Do | 0.5 | 3 | 11 |

In place of the 505-alkyd resin, there can be used the same amount of Alkyd I with similar results.

EXAMPLE 9

A white pigmented alkyd paint batch may be prepared using a catalytic composition A as follows.

| | Grams |
|---|---|
| 505–70* alkyd resin | 500 |
| Rule 66 mineral spirits | 57.3 |
| Titanium dioxide pigment let down | 632.4 |
| 505–70* alkyd resin | 572.3 |
| Rule 66 minerial spirits | 250 |
| | 2012.0 |

One kg. of the above batch is mixed with 1.0 g. of catalyst A. A film of this paint will dry dust free in 5 hours and thorough hard in 15 hours using the standard procedure at 80° F./50% H₂O (i.e. 50% relative humidity). A sample tested using the same catalyst without the cyclohexanone accelerator requires 22 hours to become thorough hard.

In place of the 505-alkyd resin, there can be used the same amount of Alkyd I with similar results.

EXAMPLE 10

The procedure of Example 1 was repeated using the 505–70 alkyd resin with the results set forth in Table G.

TABLE G

| Accelerator | Amount in grams | Time to cure in hours at 90° F./50% N₂O to— | |
|---|---|---|---|
| | | dust free | Thorough hard |
| None | | 6 | 23 |
| Furfuraldazine | 0.075 | 5 | 17 |
| 2-chlorobenzaldazine | 0.075 | 5 | 19 |

In place of the 505–70 alkyd resin in Example 10, the same amount of Alkyd I can be used with similar results.

As used in the present specification and claims, the term "aryl" is used in its normal sense to mean an aromatic hydrocarbon group and similarly the term "alkyl" is used to mean an aliphatic hydrocarbon group. The term "alkyl," unless otherwise indicated, is also intended to include "cycloalkyl," e.g. cyclohexyl and cyclopentyl.

What is claimed is:

1. A catalyst composition suitable for decreasing the drying or curing times of drying alkyd resins and oxidizable olefinic polymers comprising (1) a metal primary drying catalyst selected from the group consisting of cobalt, manganese, iron, zirconium and zinc carboxylate driers and (2) an azine or hydrazone drying accelerator having a formula selected from the group consisting of (a) 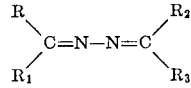

and (b) 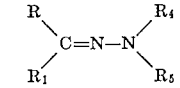

(where R, $R_2$, $R_4$ and $R_5$ are hydrogen alkyl aryl, haloaryl, haloalkyl, aralkyl, furyl or tetrahydrofuryl and $R_1$ and $R_3$ are alkyl, aryl, haloaryl, haloalkyl, aralkyl, furyl or tetrahydrofuryl, or

together is cycloalkyl of at least 3 carbon atoms and

together is cycloalkyl of at least 3 carbon atoms, said drying accelerator being present in an amount corresponding to 0.1 to 20 moles per metal atom of the primary drying catalyst.

2. A composition according to claim 1 including a hydrocarbon solvent.

3. A composition according to claim 1 including 0.001 to 10% of the drying accelerator of a hydrocarbon substituted phenol as an antioxidant.

4. A composition according to claim 1 wherein the primary catalyst is a cobalt or manganese salt of a carboxylic acid.

5. A composition according to claim 4 wherein the drying accelerator has Formula (a).

6. A composition according to claim 5 wherein the azine is a ketazine.

7. A composition according to claim 6 wherein the azine is cyclohexanone azine.

8. A composition according to claim 7 wherein the primary catalyst is a cobalt salt of a carboxylic acid.

9. A composition according to claim 5 wherein the primary atalyst is a cobalt salt of a carboxylic acid.

10. A composition according to claim 4 wherein the drying accelerator is selected from the group consisting of furfuraldazine, 2-chlorobenzaldazine, cyclohexanone, azine, benzaldazine, cyclohexanone benzaldazine, benzophenone hydrazone, benzophenone acetone azine, and acetone phenylhydrazone.

References Cited

UNITED STATES PATENTS

| 2,099,236 | 11/1937 | Sibley | 252—431 C X |
| 2,429,060 | 10/1947 | Hoover et al. | 260—865 |
| 2,456,824 | 12/1948 | Fischer | 252—431 C X |
| 2,601,293 | 6/1952 | Howard | 252—426 X |
| 2,961,331 | 11/1960 | Wheeler | 106—310 |
| 3,179,530 | 4/1965 | Erikson et al. | 260—22 CA X |
| 3,196,118 | 7/1965 | Peters | 260—22 CA |
| 3,410,719 | 11/1968 | Roper | 117—161 UHC |

PATRICK P. GARVIN, Primary Examiner

U.S. Cl. X.R.

252—431 N; 260—22 CA, 23

Disclaimer 3,630,962.—*Christian H. Stapfer*, Newtown, Pa. AZINES AND HYDRAZONES AS PAINT DRIER ACCELERATORS. Patent dated Dec. 28, 1971. Disclaimer filed Feb. 7, 1972, by the assignee, *Cincinnati Milacron Chemicals, Inc.*

Hereby enters this disclaimer to claims 1, 2, 4 and 10 of said patent.

[*Official Gazette July 18, 1972.*]